United States Patent
Cooper et al.

(10) Patent No.: US 8,887,293 B2
(45) Date of Patent: *Nov. 11, 2014

(54) METHOD, SYSTEM, AND STORAGE MEDIUM FOR SECURE COMMUNICATION UTILIZING SOCIAL NETWORKING SITES

(71) Applicant: Socialware, Inc., Austin, TX (US)

(72) Inventors: Cameron Blair Cooper, Lakeway, TX (US); Christopher Lee Richter, Cedar Park, TX (US)

(73) Assignee: Socialware, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,065

(22) Filed: Jun. 17, 2013

(65) Prior Publication Data

US 2013/0282825 A1    Oct. 24, 2013

Related U.S. Application Data

(63) Continuation of application No. 12/562,034, filed on Sep. 17, 2009, now Pat. No. 8,495,709.

(60) Provisional application No. 61/097,698, filed on Sep. 17, 2008.

(51) Int. Cl.
*H04L 29/06* (2006.01)
*G06Q 50/00* (2012.01)
*H04L 12/58* (2006.01)

(52) U.S. Cl.
CPC ............ *H04L 63/1408* (2013.01); *G06Q 50/01* (2013.01); *H04L 51/12* (2013.01); *H04L 51/32* (2013.01)
USPC .................. 726/26; 726/4; 713/153

(58) Field of Classification Search
None
See application file for complete search history.

(56) References Cited

U.S. PATENT DOCUMENTS

| | | |
|---|---|---|
| 6,549,882 B1 | 4/2003 | Chen et al. |
| 6,772,214 B1 | 8/2004 | McClain et al. |
| 7,757,175 B2 | 7/2010 | Miller |
| 8,495,709 B1 | 7/2013 | Cooper et al. |
| 8,504,681 B1 | 8/2013 | Cooper et al. |
| 2006/0224589 A1 | 10/2006 | Rowney et al. |
| 2013/0305363 A1 | 11/2013 | Cooper et al. |

OTHER PUBLICATIONS

Vance, Five Data Leak Nightmares, Jan. 2008, Network World.*
Office Action issued for U.S. Appl. No. 12/562,034, mailed Jun. 6, 2012, 7 pages.
Office Action issued for U.S. Appl. No. 12/562,034, mailed Nov. 30, 2012, 7 pages.
Notice of Allowance issued for U.S. Appl. No. 12/562,034, mailed Mar. 15, 2013, 6 pages.
Notice of Allowance issued for U.S. Appl. No. 12/562,032, mailed Apr. 4, 2013, 16 pages.
Supplemental Notice of Allowance issued for U.S. Appl. No. 12/562,032, mailed May 22, 2013, 13 pages.

* cited by examiner

*Primary Examiner* — Minh Dinh
(74) *Attorney, Agent, or Firm* — Sprinkle IP Law Group

(57) ABSTRACT

Embodiments disclosed herein provide secure communication among enterprise users utilizing social networking sites. A server computer may encrypt a post intended for a social networking site and forward the encrypted data or may save the post locally and send a placeholder to the social networking site. The server may receive a message from the social networking site containing the encrypted data or placeholder and determine that a recipient is authorized to view the original post. The server may then decrypt the data or retrieve the original post for servicing the request. In this way, authorized users of an enterprise can utilize social networking sites, which are independently owned and operated, to communicate with each other in a secure manner.

20 Claims, 10 Drawing Sheets

METHOD, SYSTEM, AND STORAGE MEDIUM FOR SECURE COMMUNICATION UTILIZING SOCIAL NETWORKING SITES

CROSS-REFERENCE TO RELATED APPLICATIONS

This application is a continuation of, and claims a benefit of priority under 35 U.S.C. 120 of the filing date of U.S. patent application Ser. No. 12/562,034, filed Sep. 17, 2009, entitled "METHOD, SYSTEM, AND STORAGE MEDIUM FOR SECURE COMMUNICATION UTILIZING SOCIAL NETWORKING SITES," which in turn claims priority from U.S. Provisional Application No. 61/097,698, filed Sep. 17, 2008, entitled "METHOD, SYSTEM, AND STORAGE MEDIUM FOR SOCIALWARE ARCHITECTURE." This application relates to U.S. patent application Ser. No. 12/562,032, filed Sep. 17, 2009, entitled "METHOD, SYSTEM, AND STORAGE MEDIUM FOR ADAPTIVE MONITORING AND FILTERING TRAFFIC TO AND FROM SOCIAL NETWORKING SITES." All applications listed in this paragraph are fully incorporated herein by reference.

TECHNICAL FIELD

This invention relates generally to social networking sites, and more particularly, to a system, method, and computer readable storage medium storing computer instructions for secure communication utilizing social networking sites.

BACKGROUND

Advances in communications technology often change how people communicate and share information. More recently, social networking sites are providing new ways for users to interact and keep others abreast of their personal and business dealings. The growth of social networking sites is staggering. New sites are emerging daily and new users are joining in droves. Today, social networking sites are being used regularly by millions of people around the globe, and it seems that social networking via websites will continue to be a part of everyday life at least in the United States.

The main types of social networking services provided by social networking sites are those which contain directories or categories, a means to connect with friends, and a means to recommend other individuals. For example, a social networking site may allow a user to identify an individual as a friend, a former classmate, or an uncle. The social networking site may recommend to the user another individual as a potential friend and also provide a personalized web page for the user to interact with those that the user has identified as "friends" via the social networking site.

Some social networking sites provide functions for members to create user profiles, send messages to other members who are their "friends," and personalize web pages available to friends and/or the general public. Through these functions, social networking sites can connect people at low cost and very high efficiency. Some entrepreneurs and businesses looking to expand their contact base have recognized these benefits and are utilizing some social networking sites as a customer relationship management tool for selling their products and services.

However, not all businesses are embracing social networking sites as an additional method to exchange information between employees, clients, vendors, etc. The integration of social networking sites into businesses raises several critical concerns. What activities are people engaged in? What information is being disclosed? Who is the information being disclosed to? Is malicious or otherwise damaging material being accessed or allowed onto the business's computers? How can a business manage the activities of particular users or groups?

Currently, there are no viable solutions to these difficult questions. Some businesses have the means to block traffic to and from social networking sites. Some businesses can only hope that their employees are only using these social networking sites in the best interest of the company. There is no guarantee that the employees may police their own access to and participation at social networking sites and there is always the concern of an employee knowingly or unknowingly posting confidential information on a social networking site. Because of these risks, many companies have not realized the efficiencies and cooperative gains that may come from embracing social networking sites.

SUMMARY

Embodiments disclosed herein provide a system, method, and computer readable storage medium storing computer instructions for adaptively monitoring and filtering traffic to and from social networking sites in an enterprise environment. Some embodiments can log an enterprise user's activities at a social networking site external to the enterprise and generate a report based on those activities. More specifically, some embodiments may intercept posts and requests between a user and a social networking web site, extract certain information from the posts and requests, and log the extracted information.

In some embodiments, information sent by an enterprise user from within an enterprise computing environment to certain social networking sites can be encrypted in a manner that only selected users and/or groups can access and/or disseminate that information. More specifically, some embodiments may intercept a post or submission by an enterprise user to a social networking site and encrypt the outgoing message and/or its payload. In some embodiments, the user's submission is persisted at an enterprise database together with a reference to the encrypted message or a placeholder to be sent to the social networking site in its place. In some embodiments, a placeholder is sent from an enterprise computer to the social networking site over the Internet. The placeholder, which may be published by the social networking site on the Internet, does not contain the enterprise user's post or submission.

Some embodiments may intercept an incoming message from a social networking site, process the information contained in the incoming message, determine if that information references a submission by a user from within an enterprise computing environment, access an enterprise database to retrieve the submission, and serve the submission to the destination indicated in the incoming message. Some embodiments may intercept an incoming message from a social networking site, determine if a decryption is needed, decrypt the message, and serve the decrypted message to the destination indicated in the incoming message. The incoming message may be destined for the user or another user within the enterprise environment.

Some embodiments provide a way for enterprise users to report potentially malicious materials on social networking sites and once confirmed, prevent access to the malicious material. More specifically, some embodiments may allow users to report potentially malicious material, verify the report, and, if found to be malicious, to block further access to the malicious material.

Some embodiments provide an enterprise with a plurality of controls on an enterprise user's social networking site activities. In some embodiments, the controls can be defined on a user and/or group level. For example, some embodiments may allow an enterprise to place various levels of restrictions on activities that its users and/or groups may be permitted to perform on certain social networking sites.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION OF THE INVENTION

Figure 1:
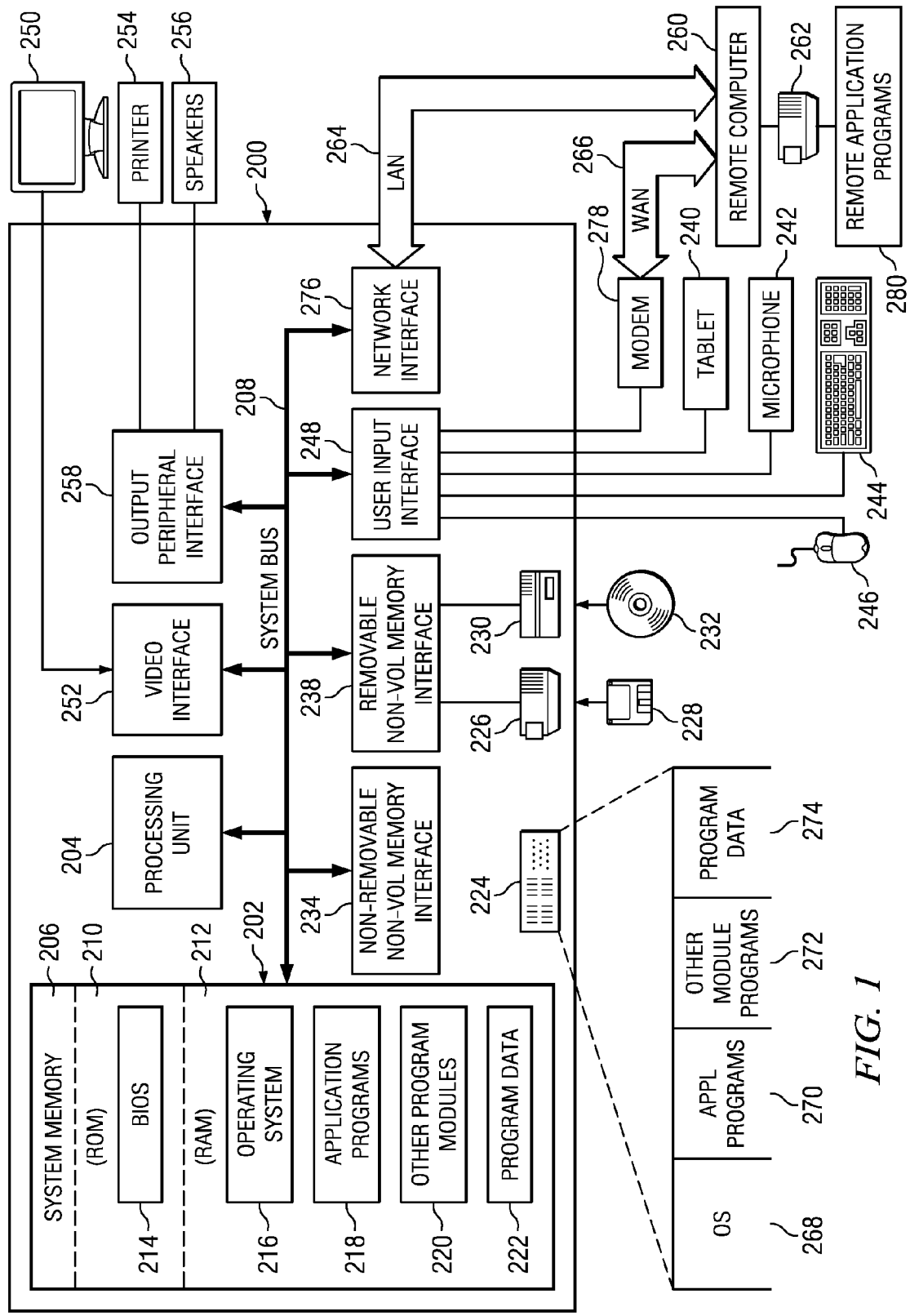
FIG. 1 depicts a diagrammatic representation of an exemplary computer system comprising at least one computer readable storage medium storing computer instructions implementing an embodiment disclosed herein.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion.

For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Those skilled in the arts will recognize that the disclosed embodiments have relevance to a wide variety of areas in addition to the specific examples described below. For example, although the examples below are described in the context of employers and employees, some embodiments disclosed herein can be adapted or otherwise implemented to work in other types of relationships, circumstances, and places such as public libraries, parent-child, school-student, or any other place or relationship where it is desirable to monitor and protect traffic to and from social networking sites.

FIG. 1 depicts an exemplary system within a computing environment where embodiments disclosed herein may be implemented. Components 202 of computing system 200 may include, but are not limited to, processing unit 204, system memory 206, and system bus 208. System bus 208 may couple various system components including system memory 206 to processing unit 204. System bus 208 may comprise any of several types of bus structures including a memory bus or memory controller, a peripheral bus, and a local bus using any of a variety of bus architectures.

Computing system 200 may include a variety of computer readable storage media. Computer readable storage media can be any available storage media that can be accessed by computing system 200. By way of example, and not of limitation, computer readable storage media may comprise volatile and nonvolatile storage media and removable and non-removable storage media. Computer readable storage media storing computer instructions implementing embodiments disclosed herein may be manufactured by known methods and materials and may rely on known programming languages and techniques for storage of information thereon. Examples of computer readable storage media may include, but are not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 200.

In the example shown in FIG. 1, system memory 206 includes ROM 210 and RAM 212. ROM 210 may store basic input/output system 214 (BIOS), containing the basic routines that help to transfer information between elements within computing system 200, such as those used during start-up. RAM 212 may store data and/or program modules that are immediately accessible to and/or presently being operated on by processing unit 204. By way of example, and not of limitation, FIG. 1 shows RAM 212 storing operating system 216, application programs 218, other program modules 220, and program data 222.

Computing system 200 may also include other removable/non-removable, volatile/nonvolatile computer readable storage media that can be employed to store computer instructions implementing some embodiments disclosed herein. By way of example only, computing system 200 may include hard disk drive 224, a magnetic disk drive 226, and/or optical disk drive 230. Hard drive 224 may read from and write to non-removable, nonvolatile magnetic media. Disk drive 226 may read from and write to removable, nonvolatile magnetic disk 228. Optical disk drive 230 may read from and write to a removable, nonvolatile optical disk 232 such as a CD ROM or other optical medium. Other removable/non-removable, volatile/nonvolatile computer readable storage media are also possible. As illustrated in FIG. 1, hard drive 224 may be connected to system bus 208 via a non-removable memory interface, such as interface 234, and magnetic disk drive 226 and optical disk drive 230 may be connected to system bus 208 via a removable memory interface, such as interface 238.

The drives and their associated computer readable storage media, discussed above, may provide storage of computer readable instructions, data structures, program modules and other data for computing system 200. For example, hard disk drive 224 may store operating system 268, application programs 270, other program modules 272 and program data 274. Note that these components can either be the same as or different from operating system 216, application programs 218, other program modules 220, and program data 222.

A user may enter commands and information into computing system 200 via input devices such as tablet or electronic digitizer 240, microphone 242, keyboard 244, and pointing device 246. Pointing device 246 may comprise a mouse, a trackball, and/or a touch pad. These and other input devices may be connected to processing unit 204 via user input interface 248. User input interface 248 may be coupled to system bus 208 or via other interface and bus structures, such as a parallel port, a game port, or a universal serial bus (USB).

Monitor or other type of display device 250 may be connected to system bus 208 via an interface, such as a video interface 252. Monitor 250 may also be integrated with a touch-screen panel or the like. Note that the monitor and/or touch screen panel can be physically coupled to a housing in which computing system 200 is incorporated, such as in a tablet-type personal computer. Computing system 200 may comprise additional peripheral output devices such as speakers 256 and printer 254, which may be connected via an output peripheral interface 258 or the like.

Computing system 200 may operate in a networked environment and may have logical connections to one or more remote computers, such as remote computing system 260. Remote computing system 260 may be a personal computer, a server, a router, a network PC, a peer device or other common network node. Although only a memory storage device 262 is shown in FIG. 1, remote computing system 260 may include many or all of the components and features described above with reference to computing system 200.

Logical connections between computing system 200 and remote computing system 260 may include local area network (LAN) 264, connecting through network interface 276, and wide area network (WAN) 266, connecting via modem 278. Additional networks may also be included.

Embodiments disclosed herein can be implemented to run on various platforms operating under system software such as IBM OS/2®, Linux®, UNIX®, Microsoft Windows®, Apple Mac OSX® and others in development or commercially available. The functionality disclosed herein may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside on one or more computer readable storage media described above. In FIG. 1, an exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are known to those skilled in the art.

Figure 2:
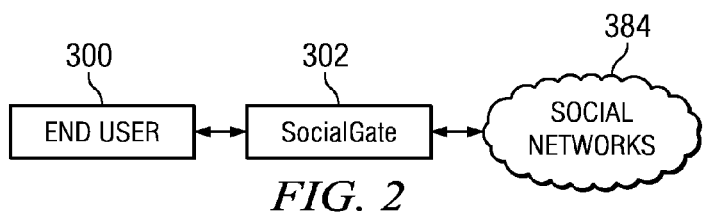
FIG. 2 depicts a diagrammatic representation of a high level network architecture implementing an embodiment disclosed herein.

FIG. 2 depicts a diagrammatic representation of a high level Socialware architecture implementing an embodiment disclosed herein. End user 300 may utilize a computing device to bi-directionally connect to SocialGate 302 which is also bi-directionally connected to one or more social networks 394. Example communications media that may facilitate such bi-directional connections may include an intranet, a virtual private network ("VPN"), and/or a wireless network, etc. As an example, social networks 394 may include, but are not limited to, Facebook®, LinkedIn®, Twitter®, MySpace®, Friendster®, Multiply®, Orkut®, Cyworld®, Hi5®, and others. All trademarks, service marks, and logos used herein are properties of their respective companies. End user 300 represents any individual in a public or private office, government, home, or school setting.

Figure 3:
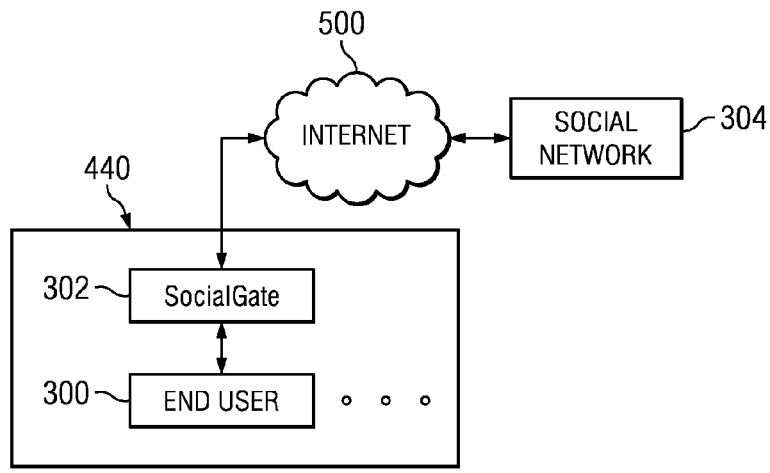
FIG. 3 depicts a diagrammatic representation of an embodiment of SocialGate in a network environment.

FIG. 3 depicts a diagrammatic representation of an embodiment of SocialGate 302 in computing environment 440. Computing environment 440 may represent an entity. Examples of such an entity may include, but are not limited to, an enterprise, a business, a company, a school, a hospital, a library, a government agency, an office, a home, and so on. For the sake of illustration and not of limitation, computing environment 440 is owned and operated by an enterprise and referred hereinafter as enterprise 440.

Social network 304 represents a social networking company independent of enterprise 440. Social network 304 may comprise hardware, software, infrastructure, and people necessary to operate and maintain social network 304. Social network 304 may be implemented in many ways known to those skilled in the art. As a specific example, a user may log in to social network 304 via a browser application or via a mobile application. The browser application may run on a wired or wireless computing device and the mobile application may run on the user's mobile phone, or both the browser application and the mobile application may run on an Internet enabled mobile phone.

In the example of FIG. 3, SocialGate 302 is communicatively coupled to social network 304 over Internet 500 and functions as a gateway or intermediary between end user 300 and social network 304. For example, all outgoing requests destined for social network 304 are routed through Social-Gate 302 where they can be handed off to additional applications for analysis, logging, and possible modification. End user 300 may interact with social network 304 through SocialGate 302. For the purpose of illustration, and not of limitation, a server machine in social network 304 may be responsible for receiving all incoming requests from and sending corresponding responses to end user 300 via Social-Gate 302.

Figure 4:
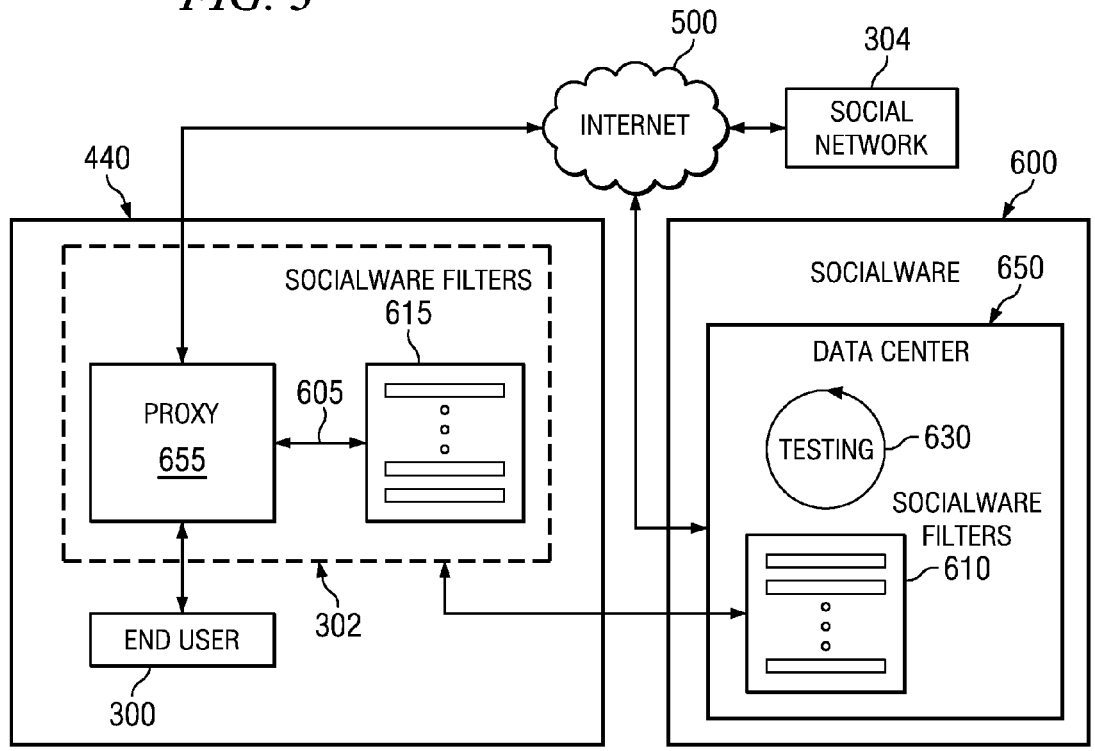
FIG. 4 depicts a diagrammatic representation of an embodiment of SocialGate working in conjunction with an embodiment of Socialware Data Center.

FIG. 4 depicts a diagrammatic representation of an embodiment of SocialGate 302 working in conjunction with an embodiment of Data Center 650. In some embodiments, SocialGate 302 may be implemented as a middleware that sits between enterprise applications and external, third party applications. These applications may run on different operating systems/platforms. SocialGate 302 may have no control over the enterprise applications. SocialGate 302 may also have no control over the third party applications. However, as described below, SocialGate 302 can continuously and adaptively monitor the third party applications over a public network. Within this disclosure, social networks 349 exemplify such third party applications.

Data Center 650 may be owned and operated by a company independent of enterprise 440 and of social network 304. For example, in one embodiment, Data Center 650 may be owned and operated by Socialware 600. Data Center 650 may comprise one or more machines, each having at least one computer readable storage medium. The at least one computer readable storage medium may store computer instructions implementing testing functionality 630. The at least one computer readable storage medium may also store Socialware filters 610.

In some embodiments, SocialGate 302 may be communicatively coupled to Data Center 650 over a network such as Internet 500. In some embodiments, SocialGate 302 may comprise Socialware filters 615 stored on one or more computer readable storage media in enterprise 440. Within this disclosure, a filter comprises a piece of code that is designed to recognize a particular portion of an application-level dynamic protocol. Hypertext Transfer protocol (http) is an example of an application-level protocol. Unlike defined or otherwise standardized protocols such as those used in e-mail communications and instant messaging, dynamic protocols used by social networking sites may change over time, be undefined, and/or vary from site to site. Dynamic protocols are known to those skilled in the art and techniques for parsing network traffic in such protocols are also known to those skilled in the art.

In some embodiments, Socialware filters 615 that are used by SocialGate 302 in enterprise 440 may be continuously updated by Data Center 650 of Socialware 600, perhaps over a network such as Internet 500. Maintenance of Socialware filters 615 may comprise testing Socialware filters 610 utilizing testing functionality 630 at Data Center 650. Socialware filters 615 may comprise all or a portion of Socialware filters 610.

In some embodiments, testing functionality 630 may comprise a test driver written to cause a real-time test signal to be passed through a particular filter. If the filter does not produce the correct result, it is broken. When a filter is broken, Data Center 650 and/or an application thereof will be notified. A user at Data Center 650 reviews the filter, analyzes the signal, and determines what caused the filter to break down, and modify the filter accordingly. SocialGate 302 is updated in real-time or near real-time with the updated filter.

As an example, suppose Facebook, a social networking site, changes how they deliver an AJAX response containing a message. It may have originally been in HTML format, but updated to be JSON. Testing functionality 630 at Data Center 650 can detect this change. Extensible markup language (XML), asynchronous JavaScript and XML (AJAX), Hypertext Markup Language (HTML), and JavaScript Object Notation (JSON) are known to those skilled in the art and thus are not further described herein.

More specifically, testing functionality 630 may generate a test message. In some embodiments, this is performed by a test driver written to test a specific aspect of Facebook. The test message is sent from Data Center 650 to Facebook and may be one of many that are sent from Data Center 650 to Facebook over the Internet as illustrated in FIG. 4. In response, Facebook transmits a message as follows:

<div class="message">This is a Facebook message</div>.

After the Facebook message is received at Data Center 650, the test driver sends it to a filter designed to parse the specific aspect of Facebook for which the test driver is written. Below is an example of a filter for parsing the example Facebook message in HTML.

Filter 1 - Parse HTML Message

```
void parse(String payload) {
    HTMLDoc doc = HTMLDoc.parse( payload );
    HTMLElement element = doc.findByClass( "message" );
    String message = element.text( );
    return message;
}
```

The test driver then compares the output from the filter with the test message that the test driver had generated and sent to Facebook. If there is not a difference, the filter does not need to be updated.

In some cases, a social networking site may update their application changing from one message format to another. Following the above example, suppose Facebook changes from using HTML to JSON and responds to the same test message as follows:

{"message":"This is a Facebook message"}

The test driver sends the received Facebook message to Filter 1 for parsing as before and this time the filter does not parse the message properly. The test driver compares the output from the filter and determines that there is a difference between the output from the filter and the original test message, i.e., the filter is broken and needs to be updated. Testing functionality 630 may operate to notify a user such as an engineer at Data Center 650. Testing functionality 630 may also notify SocialGate 302 in enterprise 440. The engineer may recognize the new message format now used by Facebook and update the filter or provide new filter to correctly parse messages in the new message format. Following the above example, a replacement new filter may be written as follows:

Filter 2 - Parse JSON

```
void parse(String payload) {
    JSONArray array = JSONArray.parse( payload );
    String message = array.get( "message" ).toString( );
    return message;
}
```

The updated or new filter is persisted at Data Center 650 with Socialware filters 610 and in enterprise 440 as part of Socialware filters 615. In some embodiments, Data Center 650 may push the updated filter to SocialGate 302 in real-time or substantially real-time. In some embodiments, SocialGate 302 may pull the updated filter from Data Center 650 as part of its maintenance routine or whenever needed.

Testing functionality 630 may comprise a plurality of test drivers that continuously generate test messages for testing various social networking sites. This testing is done continuously at Data Center 650 for each of Socialware filters 610 to ensure the integrity of Socialware filters 615 in enterprise 440.

One skilled in the art will appreciate that other types of filters are also possible. For example, various filters can be written for access control, for content control, for understanding how, when, and what application external to enterprise 440 is changing, and/or what type of change is involved. It could be a functional change, a layout change, a message format change, etc. For example, some embodiments may implement one or more of the following non-limiting types of filters:

1) Access control filters. These filters manipulate the code of a web application to enable and disable access to certain features depending on who the accessing user is. Some embodiments of SocialOrganizer 316 disclosed herein may utilize access control filters.

2) Data archiving filters. These filters record information as it is transmitted across the wire. This may be information that is posted to social networks, or retrieved from social networks. Some embodiments of SocialAnalyzer 310 disclosed herein may utilize data archiving filters.

3) Data security filters. These filters monitor information as it is published to social networks. If data is deemed private or sensitive (by a Data Leakage Protection system or otherwise), the user will be sent a notification that they are not allowed to post that information. Some embodiments of SocialPatroller 312 disclosed herein may utilize data security filters.

4) Secure messaging filters. These filters trap information before it is able to post to a social network and store it internally. The message is replaced or otherwise substituted with a placeholder that is sent to the social network. If a Socialware user is sent the message with the placeholder, Socialware will remove the placeholder and display the original message. In some embodiments, Socialware is implemented as a middleware. In some embodiments, Socialware is implemented in an appliance. Some embodiments of SocialCypher 314 disclosed herein may utilize secure messaging filters.

5) Notification Filters. These filters notify the user of certain information. For example, a company watermark may be placed onto a social network, informing a user of the company usage policy.

Below are non-limiting examples of various types of Socialware filters.

1) Access control filter, to disable Facebook chat:

```
void process(String page, User user) {
    HTMLDoc doc = HTMLDoc.parse( page );
    if (user.canAccessFacebookChat( ) == false) {
        doc.findById( "chat" ).delete( );
    }
}
```

2) Data archiving filter, to record Facebook chat:

```
void process(String page, User user) {
    HTTPPost post = HTTPPost.parse( page );
    String fromUsername = post.getParam( "fromUser" );
    String toUsername = post.getParam( "toUser" );
    String message = post.getParam( "message" );
    DataStore.record( fromUser, toUser, message );
}
```

3) Data security filter, to block credit card numbers from posting to Facebook walls:

```
void process(String page, User user) {
    HTTPPost post = HTTPPost.parse( page );
    String wallPost = post.getParam( "wall_post" );
    if ( ContainsCreditCardNumber( wallPost ) == true ) {
        ReturnErrorToUser( );
    } else {
        AllowMessageToPost( );
    }
}
```

4) Secure messaging filter, to replace Facebook wall post messages with a placeholder:

```
// When posting a facebook wall post
void process( String page, User user ) {
    HTTPPost post = HTTPPost.parse( page );
    String message = post.getParam( "wall_post" );
    String placeholder = GetPlaceholder( message );
    post.setParam( "wall_post" );
    // update the page with the new placeholder instead of message
    page = post.toString( );
}
// When viewing a wall message
void process( String page, User user ) {
    String placeholder = GetPlaceholder( page );
    String message = GetMessage( placeholder );
    // replace the placeholder with the original message
    page.replace( placeholder, message);
}
```

5) Notification Filters, add a watermark to facebook

```
void process( String page, User user ) {
    HTMLDoc doc = HTMLDoc.parse( page );
    // Insert new HTML code for the watermark
    doc.addElement ( GenerateFacebookWatermark( ) );
    page = doc.toString( );
}
```

Other types of filters are also possible. In some embodiments, some or all Socialware filters 615 may be defined by enterprise 400 and maintained/updated by Data Center 650. Enterprise 400 may comprise rules on how to apply Socialware filters 615. These rules link transmissions to filters. For example, a rule may operate to examine the URL a user is accessing, and determine if that URL corresponds to a particular filter. If so, that filter will be placed on the transmission. Rules may be stored on a network server or a storage medium accessible by the server.

In some embodiments, SocialGate 302 may comprise at least one computer readable storage medium storing Socialware filters 615 and software and/or hardware components for communicating with enterprise applications, social networking site applications, and Data Center 650. In some embodiments, SocialGate 302 may further comprise one or more processors for translating instructions stored on the computer readable storage medium. In some embodiments, those instructions may include providing a set of services over communication medium 605 to a server that handles all incoming and outgoing traffic for enterprise 440. In some embodiments, the server is a proxy server. As shown in FIG. 4, in some embodiments, proxy server 655 may be part of SocialGate 302. In some embodiments, proxy server 655 may be connected to a plurality of users in enterprise 440. In some embodiments, the plurality of users may comprise end user 300.

Figure 5:
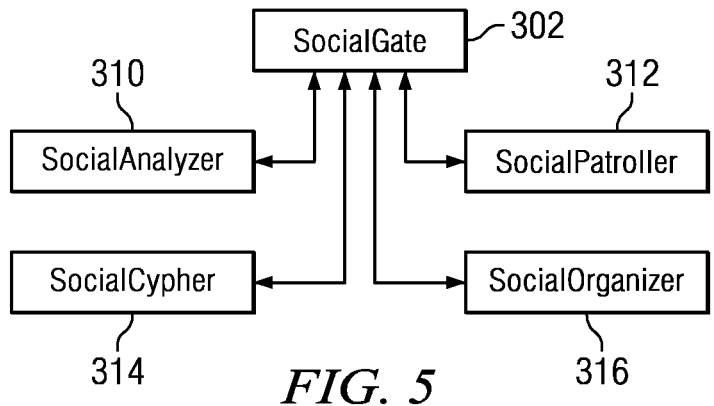
FIG. 5 depicts a diagrammatic representation of an embodiment of SocialGate working in conjunction with a plurality of software applications connected thereto, including SocialAnalyzer, SocialCypher, SocialPatroller, and SocialOrganizer.

FIG. 5 depicts a diagrammatic representation of an embodiment of SocialGate working in conjunction with a plurality of software applications connected thereto, including SocialAnalyzer, SocialCypher, SocialPatroller, and SocialOrganizer. SocialAnalyzer 310 monitors network traffic, logs relevant information, and produces reports based on the network traffic and logs. Social Patroller 312 scans content from social networks for potentially malicious data, alerts users of potentially malicious data, and provides a means to block malicious data. SocialCypher 314 monitors information sent to social networks and automatically encrypts designated information such that the information is not viewable by unauthorized users. SocialCypher 314 also monitors information from social networks and automatically decrypts any information for which the user is authorized to see. Finally, SocialOrganizer 316 uses user/group defined roles and permissions to allow and restrict end user activity for social networks. Each of these applications is discussed in greater detail below.

Figure 6:
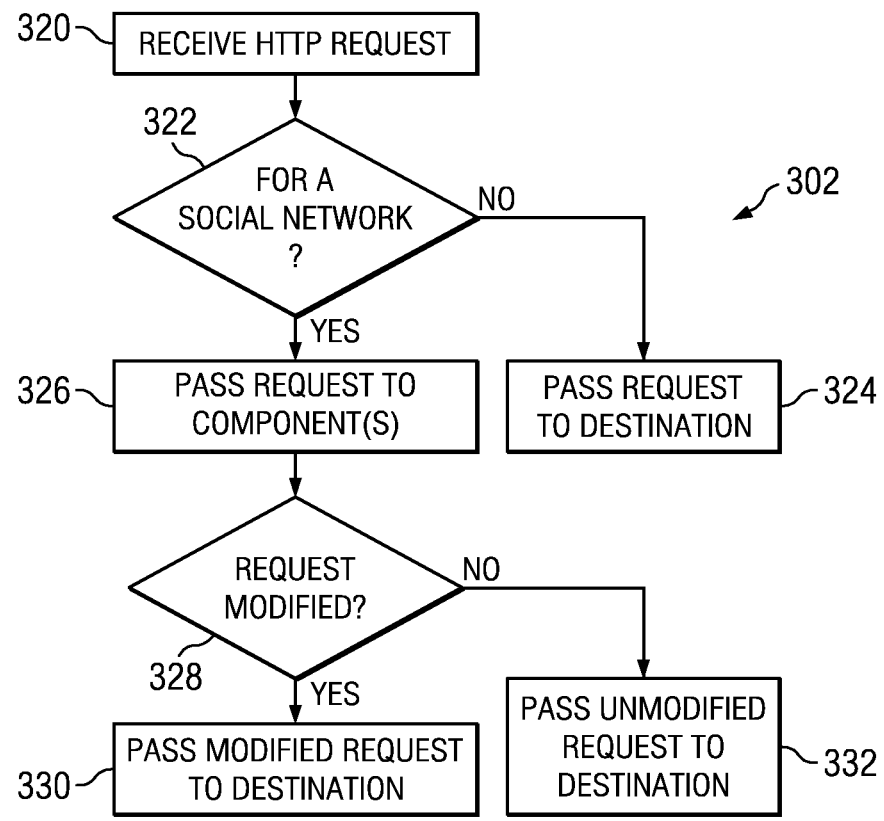
FIG. 6 depicts a flow chart illustrating several functions of an embodiment of SocialGate.

FIG. 6 depicts a flow chart illustrating several functions of an embodiment of SocialGate 302. First, an HTTP request is received 320. The request is analyzed to see if it is directed to or came from a social network 322. If the request is not from or to a social network, the request is passed along to its destination without any modification or logging 324. However, if the request is from or to a social network, the request is passed to one or more of the individual applications associated with SocialGate 302 for handling 326. When the individual application(s) have completed, the request is passed back and if the request is modified 328, the modified request is forwarded to the original destination 330. If the request was not modified, the unmodified request is forwarded to the original destination 332. In the case of SocialOrganizer 316 and Social Patroller 312, the request may be blocked entirely and not forwarded to the original destination as will be more fully discussed below.

Figure 7:
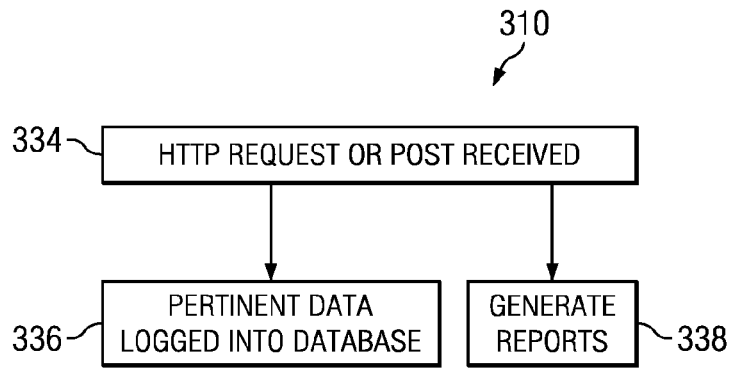
FIG. 7 depicts a flow chart illustrating several functions of an embodiment of SocialAnalyzer.

FIG. 7 depicts a flow chart illustrating several functions of an embodiment of SocialAnalyzer 310. When a request is received 334, pertinent data is logged in a database 336. This data could include, but is not limited to: request origin, request destination, requested service, content of request, time and date, etc. Furthermore, based on this logged data, reports are generated 338. Example reports could include, but are not limited to: which social networks are used, how each social network is being used, who is using the social networks, what services are most widely used, etc. SocialAnalyzer 310 acts only as a monitor and does not modify or otherwise intervene with any request. This provides significant advantages to industries that require detailed audit trails and logging. Example industries that may require detailed audit trails and logging include medical, government, public companies, etc.

Figure 8:
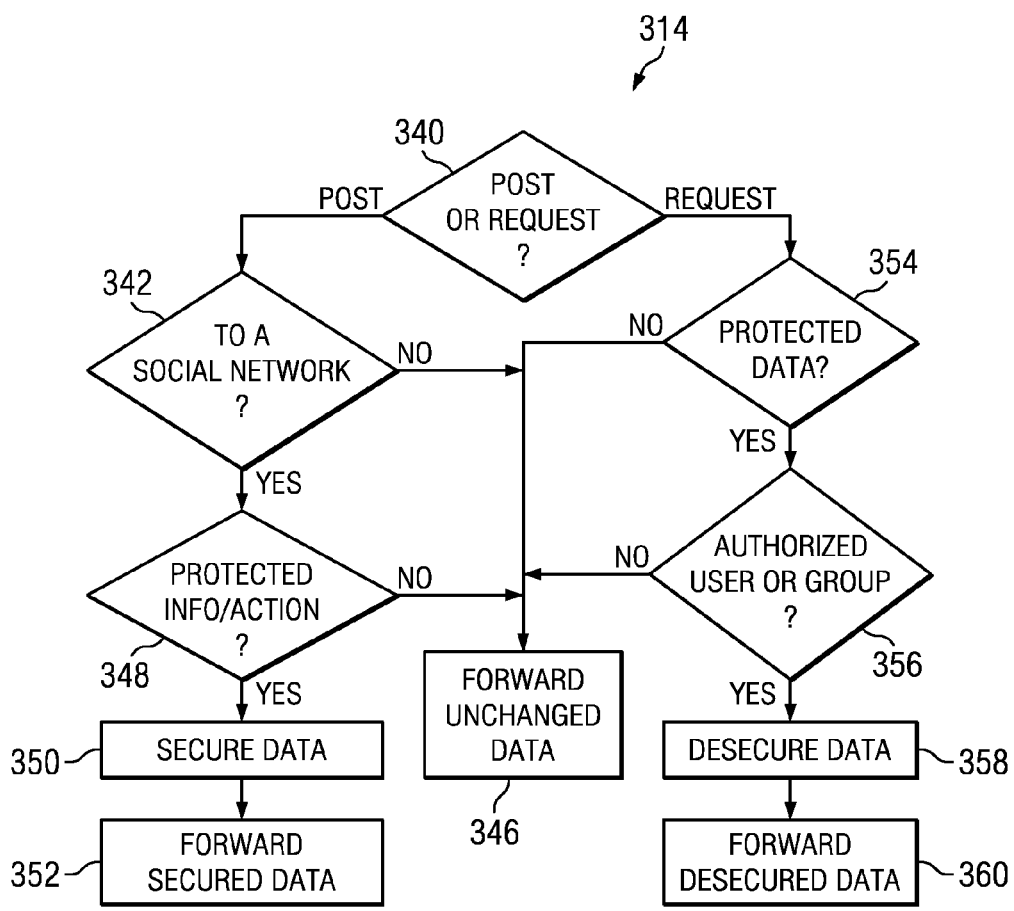
FIG. 8 depicts a flow chart illustrating several functions of an embodiment of SocialCypher.

FIG. 8 depicts a flow chart illustrating several functions of an embodiment of SocialCypher 314. First, SocialCypher 314 determines whether the HTTP traffic handed to it is a post or request 340. Generally, a post is traffic going from an end user to a website and a request is traffic coming from a website to an end user. If the traffic is a post, SocialCypher 314 determines whether the post is to a social network 342. If the post is not to a social network, the post is forwarded unmodified 346. However, if the post is to a social network, the post is further analyzed to determine if the post contains information that needs to be protected or is associated with one or more activities or actions that need to be protected 348. If the information and/or action(s) do not require protective action, the post is forwarded unmodified 346. If the post contains confidential information, SocialCypher 314 may operate to take protective action to secure or prevent the information and/or action(s) 350. For example, suppose a file attached to the post requires protection, the file is encrypted and forwarded to the destination 352. In some embodiments, SocialCypher 314 is capable of performing on-the-fly encryption. As another example, suppose the act of attaching a file, which is stored within enterprise 440, to a post intended for a social networking site outside of enterprise 440 is a protected action or impermissible activity, SocialCypher 314 may operate to prevent the attachment from taking place.

If the traffic is a request, the traffic is analyzed to determine if the request contains protected information 354. If the request does not contain any protected or encrypted information, the request is forwarded unmodified 346. However, if the request contains protected information, SocialCypher 314 determines if the proposed recipient of the protected information is an authorized user or group 356. If not, the request containing the protected information is passed to the recipient unmodified 346. Since the request is not modified and no decryption is performed on the protected information, the recipient may receive the protected information as-is. If the proposed recipient is an authorized user or group, SocialCypher 314 decrypts or otherwise de-secures the information 358 and forwards the decrypted information to the recipient 360. In some embodiments, SocialCypher 314 is capable of performing on-the-fly decryption. In this way, while the secured information may be passed to non-authorized users or groups, only authorized users or groups can read the original information.

To secure the information, a defined cipher mechanism such as substitution or encryption can be employed. In the event that substitution is used, the protected data will be substituted for a placeholder and the original data will be diverted to a database for storage. If encryption is used, the data will be encrypted before it is sent to the social network. Placeholder substitution is useful in the event that the enterprise (or other user) wants to maintain complete control of their data and not let it reside on a third-party social networking site. An example of placeholder substitution is provided below with reference to FIG. 9.

Figure 9:
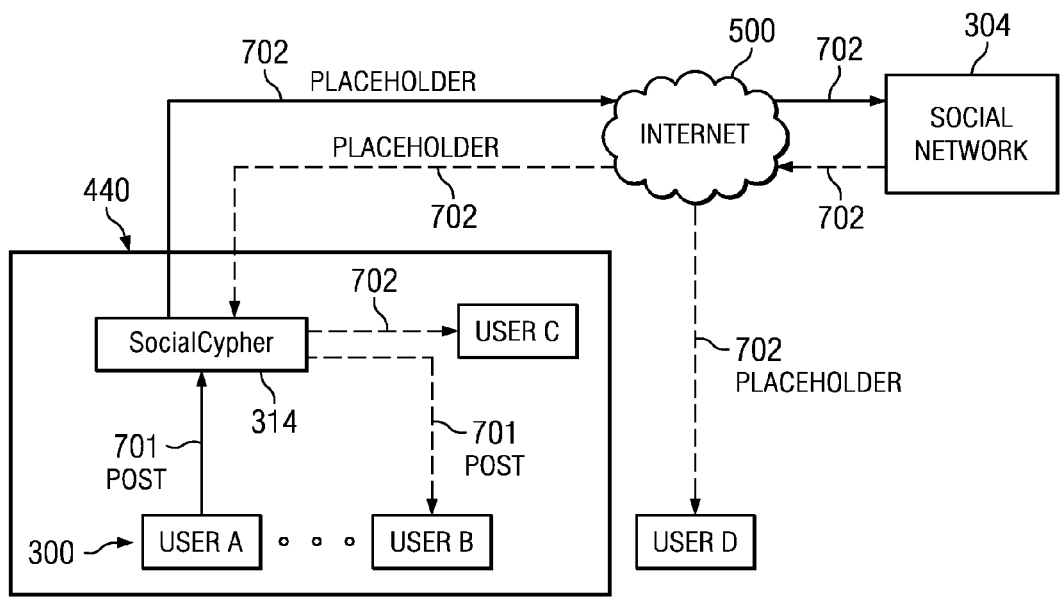
FIG. 9 depicts a diagrammatic representation of an embodiment of SocialCypher communicatively coupled to an example social networking site over the Internet.

FIG. 9 depicts a diagrammatic representation of an embodiment of SocialCypher 314 communicatively coupled to social network 304 over the Internet. In some embodiments, SocialCypher 314 may be implemented as part of SocialGate 302. In some embodiments, SocialCypher 314 may be implemented as one of Socialware filters 615. In this example, User A in enterprise 440 accesses social network 304 and sends post 701 intended for social network 304. SocialCypher 314 intercepts post 701 and determines that post 701 is for social network 304 and that post 701 contains information that needs to be protected from being viewed outside of enterprise 440. SocialCypher 314 therefore saves post 701 from User A in a non-volatile memory or storage location in enterprise 440, substitute post 701 with placeholder 702, and sends placeholder 702 to social network 304. From the perspective of social network 304, placeholder 702 is a post by User A and is processed as such by social network 304.

Subsequently, User B in enterprise 440 also accesses social network 304. Because User B is allowed to view posts made by User A in social network 304, in response to User B's request for accessing social network 304, social network 304 transmits the posts by User A, including placeholder 702, to enterprise 440. SocialCypher 314 receives the incoming traffic from social network 304, determines that it contains placeholder 702, retrieves the original post 701 associated with placeholder 702, and forwards post 701 by User A to User B. As describe above, as another layer of security measure, before sending post 701 to User B, SocialCypher 314 may determine whether User B is authorized to view post 701 by User A. This is in addition to the privacy and/or security measures set by User A and/or social network 304. For example, according to privacy/security settings in social network 304, User C in enterprise 440 is also allowed to view all posts by User A. However, SocialCypher 314 may determine that User C is not authorized to view post 701 by User A and forward placeholder 702 to User C. This additional layer of protection can be useful in an enterprise setting in which sensitive information can be protected from or provided to a user, depending upon that user's role or security clearance in the enterprise. Because post 701 is not sent outside of enterprise 440 and because placeholder 702 is stored by social network 304 in its place, even if external users (represented by User D in FIG. 9) are allowed to view all posts by User A, they can only see placeholder 702 and not post 701.

Figure 10A:
FIG. 10A depicts a screenshot of an example post intended for a social networking site.
Figure 10B:
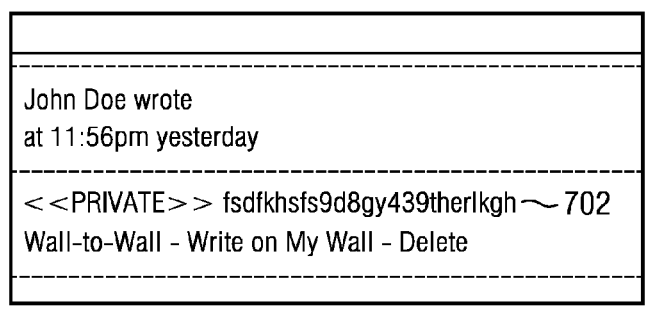
FIG. 10B depicts a screenshot of an example placeholder for the post of FIG. 10A.
Figure 10C:
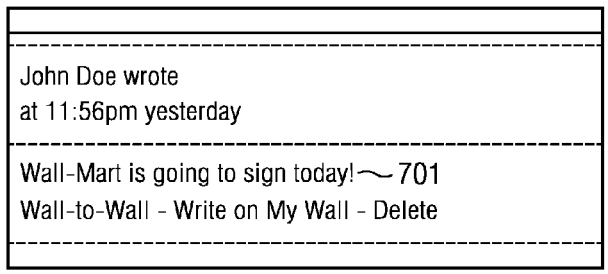
FIG. 10C depicts a screenshot of the post of FIG. 10A as viewed by an authorized user.

FIG. 10A depicts a screenshot of an example post 701. FIG. 10B depicts a screenshot of an example placeholder 702, showing what an unauthorized user would see on the social networking site in place of the original post. As FIG. 10B illustrates, placeholder 702 may contain encrypted information in the form of some seemingly random alphanumeric nonsense. FIG. 10C depicts a screenshot of post 701 as viewed by an authorized user.

Figure 11:
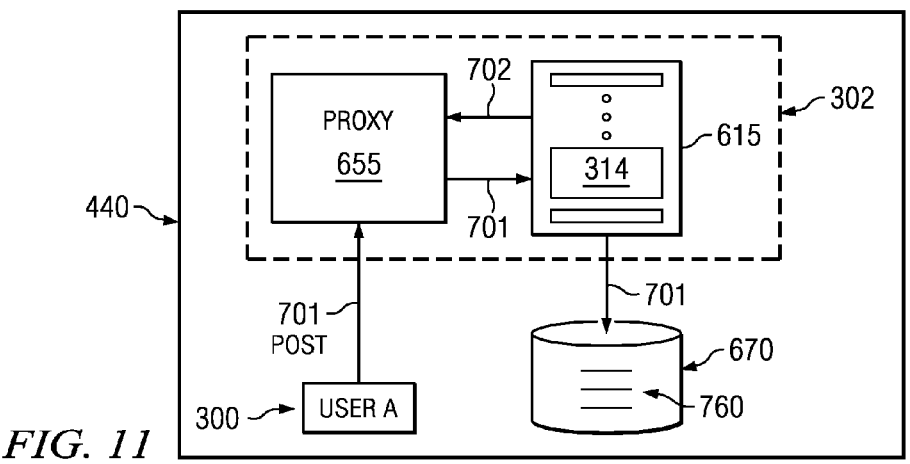
FIG. 11 depicts a diagrammatic representation of an embodiment of SocialCypher operating in an enterprise computing environment.

FIG. 11 depicts a diagrammatic representation of an embodiment of SocialCypher 314 operating in an enterprise computing environment. More specifically, enterprise 440 may comprise data repository 670 for storing posts 760 originated within enterprise 440. In this embodiment, SocialCypher 314 is implemented as part of SocialGate 302. Specifically, SocialCypher 314 is implemented as a filter of Socialware filters 615 residing within SocialGate 302. SocialGate 302 may be implemented as a fixed function device or appliance having proxy 655 connected to end user 300. End user 300 may send post 701 to proxy 655 and proxy 655 may make a service call containing post 701 to SocialCypher 314. In response, SocialCypher 314 may save post 701 in repository 670 connected to SocialGate 302 and returns placeholder 702 to proxy 655. Proxy 655 may then forward placeholder 702 to an external third party application or social networking site as described above.

Figure 12:
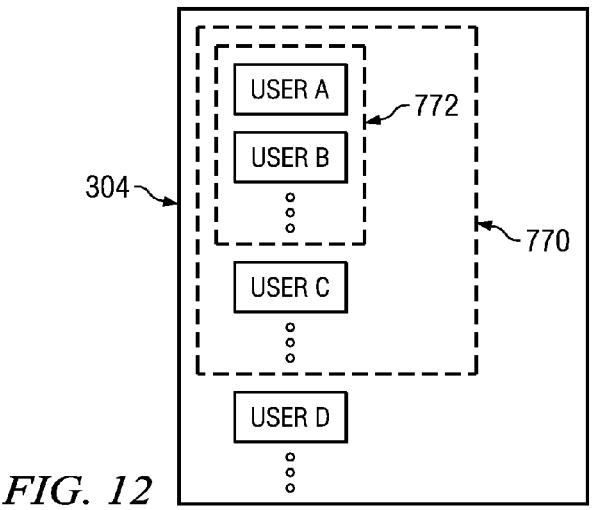
FIG. 12 depicts a diagrammatic representation of how a user's post may be viewed on a social networking site by various users, utilizing an embodiment of SocialCypher.

FIG. 12 depicts a diagrammatic representation of an enterprise utilizing an embodiment of SocialCypher 314 to control how an enterprise user's post may be viewed on a social networking site. Suppose User A, User B, User C, and User D are all friends on social network 304. However, User D is not an employee of enterprise 440 and network traffic between User D and social network 304 is not monitored by SocialCypher 314. As represented by group 770, User A, User B, and User C work for enterprise 440 and SocialCypher 314 monitors traffic between social network 304 and User A, User B, and User C, checks information to be posted on social network 304, and modifies the information where necessary.

Consequently, even though User D is a friend of User A on social network 304, User D may not be able to view all posts made by User A within enterprise 440. Within group 770, there may be one or more subgroups. User A and User B are in subgroup 772 as they both work for the same engineering group in enterprise 440. Enterprise 440 may determine that User C, which is in sales, should not view sensitive or confidential information posted by the engineering group. This setting can be implemented by SocialCypher 314 which operates to prevent User C from viewing sensitive or confidential information posted by the engineering group.

Figure 13A:
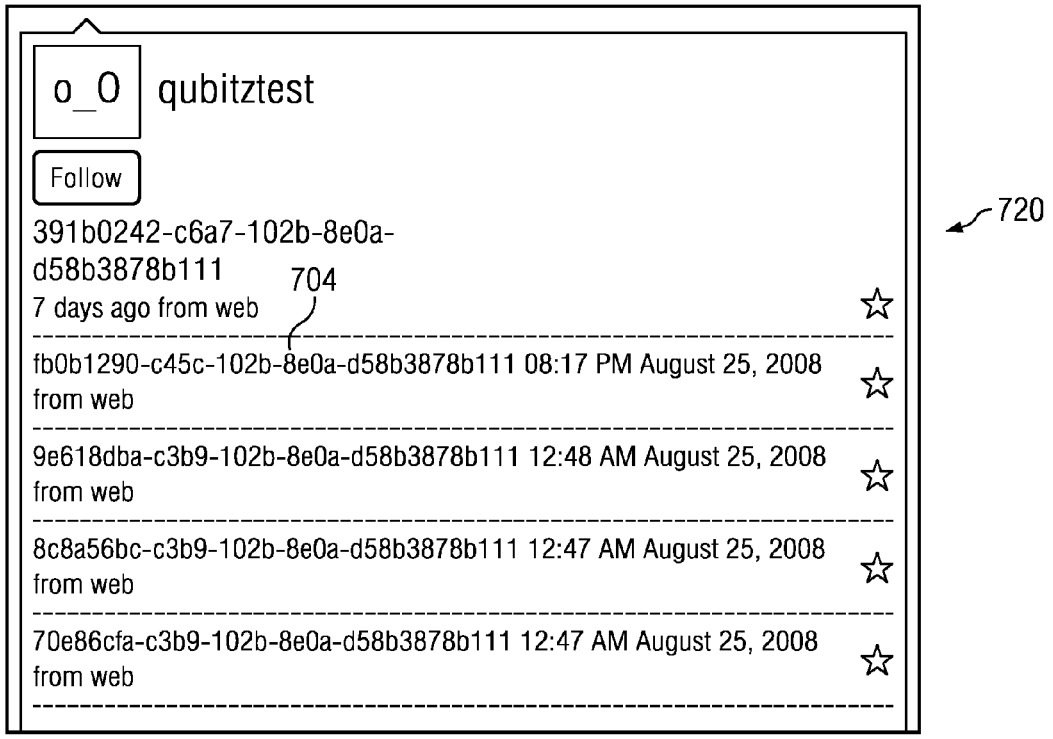
FIG. 13A depicts a screenshot of an example social networking web page showing posts that are encrypted by an embodiment of SocialCypher and that may be viewed by unauthorized users.
Figure 13B:
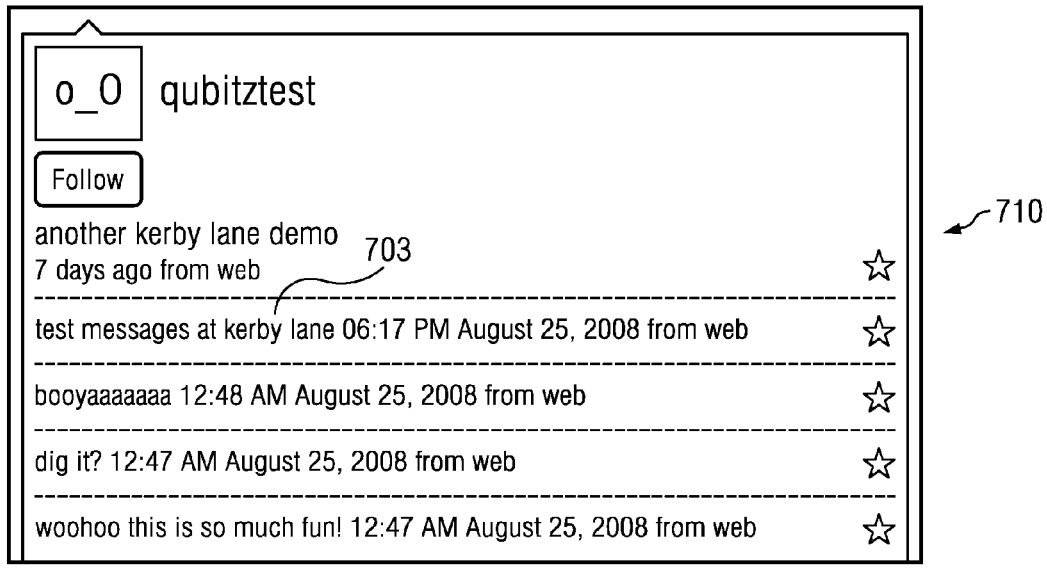
FIG. 13B depicts a screenshot of an example social networking web page showing posts of FIG. 13A that are decrypted by an embodiment of SocialCypher to be viewed by authorized users.

FIG. 13A depicts a screenshot of example social networking web page 720 showing posts 704 that are encrypted by an embodiment of SocialCypher 314 and that may be viewed by unauthorized users. FIG. 13B depicts a screenshot of an example social networking web page 710 showing posts 703 as decrypted by an embodiment of SocialCypher 314 to be viewed by authorized users.

Figure 14:
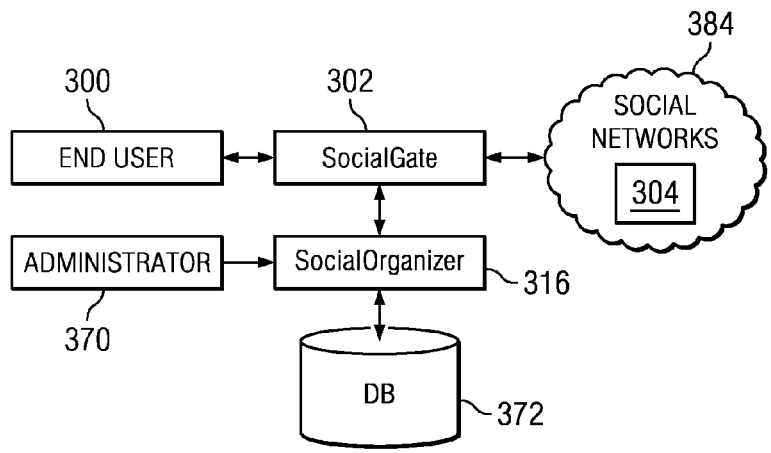
FIG. 14 depicts a diagrammatic representation of an example interaction between embodiments of SocialGate and SocialOrganizer.

FIG. 14 depicts a diagrammatic representation of an example interaction between embodiments of SocialGate 302 and SocialOrganizer 316. Generally, SocialOrganizer 316 provides the ability to define organizational roles, giving each role access to specific social networking capabilities. In some embodiments, administrator 370 may have direct access to SocialOrganizer 316. The SocialOrganizer 316 may store administrators 370 settings in database 372. When end user 300 attempts to access social network 304, SocialGate 302 intercepts the traffic from end user 300 and requests SocialOrganizer 316 to verify that end user 300 is authorized to access social network 304.

Figure 15:
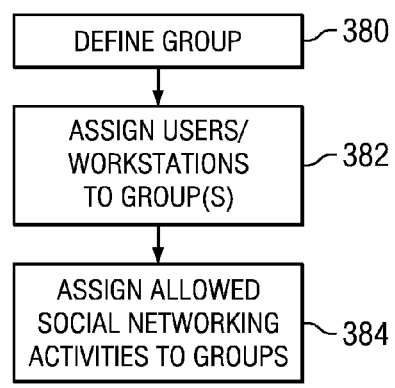
FIG. 15 depicts a flow chart illustrating the administration of an embodiment of SocialOrganizer application.

FIG. 15 depicts a flow chart illustrating the administration of an embodiment of SocialOrganizer 316. In this example, Administrator 370 first defines a group 380. After defining a group, individual users or workstations are assigned to the group 382. Finally, allowed and/or restricted activities are assigned to the group 384. Although not directly shown here, users and/or workstations may also be added or removed from an existing group. Furthermore, allowed and/or restricted activities can be modified for existing groups.

Figure 16:
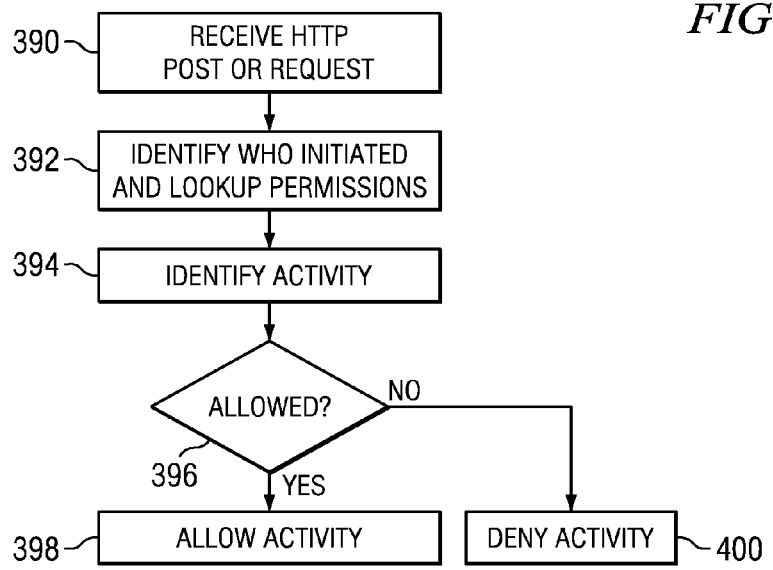
FIG. 16 depicts a flow chart illustrating several functions of an embodiment of SocialOrganizer.

FIG. 16 depicts a flow chart illustrating several functions of an embodiment of SocialOrganizer 316. When a HTTP post or request is received 390, SocialOrganizer 316 identifies what user/workstation initiated the post or request and identifies the permitted/restricted actions or activities 392. Then SocialOrganizer 316 identifies the specific activity contained in the post or request 394. If the activity is allowed 396, SocialOrganizer 316 permits the activity to take place by not blocking the activity 398; however, if the activity is not allowed 396, then SocialOrganizer 316 operates to block the activity 400. In some embodiments, the initiating user/workstation is shown a message explaining that the activity has been blocked because the user/workstation does not have the proper permissions to execute the desired action. Although described as first identifying who initiated the request, in some embodiments, SocialOrganizer 316 may first identify the specific activity contained in the post or request.

Figure 17:
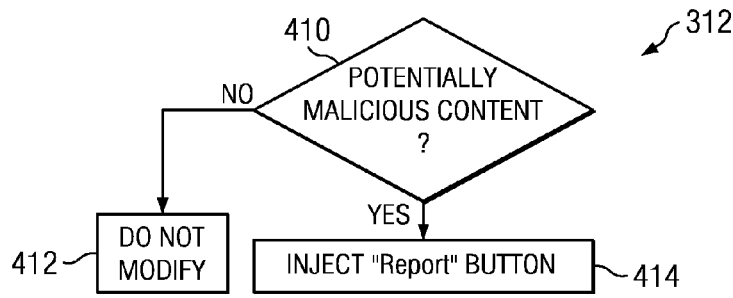
FIG. 17 depicts a flow chart illustrating several functions of an embodiment of SocialPatroller.

FIG. 17 depicts a flow chart illustrating several functions of an embodiment of SocialPatroller 312. Social Patroller 312 may comprise two major functions: (a) injecting a report function into potentially malicious content on social networking sites; and (b) blocking confirmed malicious content on social networking sites from being access from within enterprise 440. More specifically, in some embodiments, Social Patroller 312 may identify whether a particular action or traffic is potentially malicious 410. If the action or traffic is not potentially malicious, Social Patroller 312 does not modify the action or traffic 412; however, if the action or traffic is potentially malicious, Social Patroller 312 may operate to inject or otherwise add a report function to a page or document to be viewed by the recipient. In some embodiments, the added report function is displayed on the page or document as a "Report" button.

Figure 18:
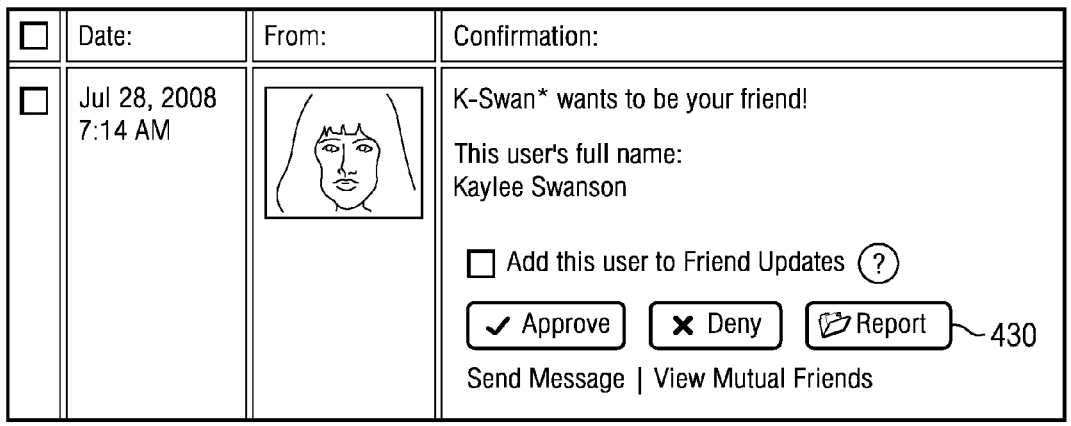
FIG. 18 depicts a screenshot of a user interface through which a user is able to approve, deny, or report a particular activity of another user.

FIG. 18 depicts a screenshot of a user interface through which a user is able to approve, deny, or report a particular activity of another user. In some embodiments, every piece of content that is delivered to an end user is monitored for potentially malicious content. In this example, Social Patroller 312 may determine that the incoming request from K-Swan is potentially malicious. Thus, Social Patroller 312 adds "Report" button 430 to allow the recipient to approve, deny, or report this request.

Figure 19:
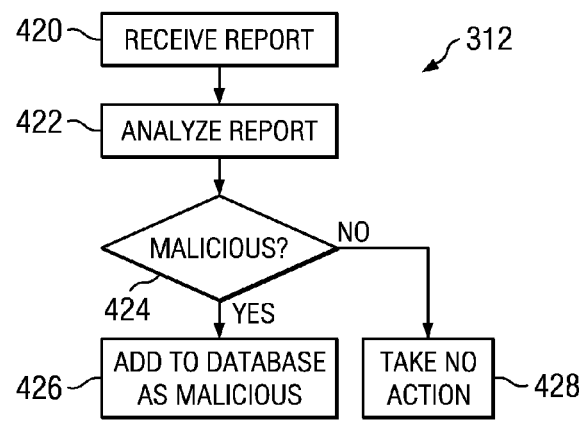
FIG. 19 depicts a flow chart illustrating the operation of an embodiment of Social Patroller after receiving a report.

FIG. 19 depicts a flow chart illustrating the operation of an embodiment of Social Patroller 312 after receiving such a report. Social Patroller 312 receives report 420. The report is analyzed 422 to determine if the reported content is actually malicious 424. In some embodiments, the report may be reviewed manually to determine whether the content is actually malicious. In some embodiments, the report evaluation could be automated based on a set of rules or using applications similar to "virus" style scans. If the content is determined to be non-malicious, no further action is taken 428. However, if the content is determined to be malicious, then the content is added to a database and future access to the content is restricted or otherwise modified 426. If a later user attempted to access content that was determined to be malicious, the access request would be denied or otherwise alerted. In some embodiments, if the content was blocked, the user would also receive a message indicating that the content the user attempted to access was blocked because the content was determined to be malicious.

In some embodiments, the blocked or otherwise logged malicious and potentially malicious content are hosted independent of the individual applications described above. This allows the most up-to-date information to be immediately available to Social Patroller 312. This also provides the most current information to Social Patroller 312 without any additional intervention by the user such as: manual download, installation, update, etc.

Figure 20:
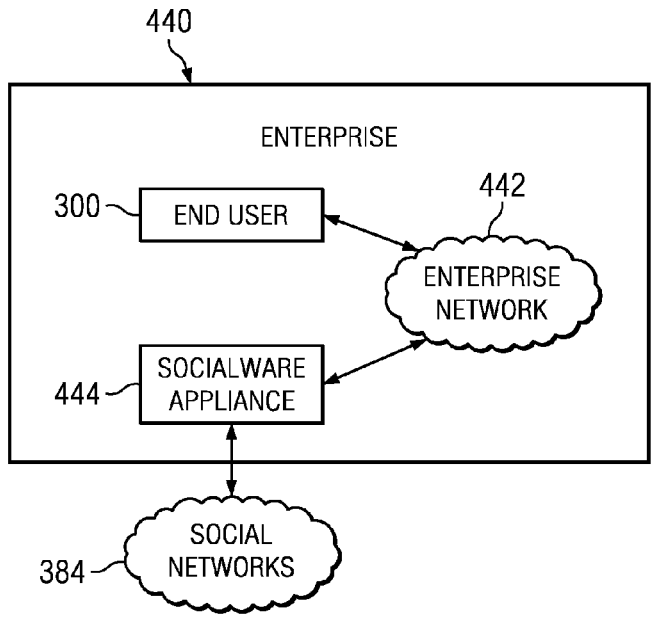
FIG. 20 depicts a diagrammatic representation of an example Socialware appliance positioned between an enterprise network and external social networking sites, the Socialware appliance implementing one or more embodiments disclosed herein.

FIG. 20 depicts a diagrammatic representation of an example Socialware appliance 444 implementing one or more embodiments disclosed herein. In this example, Socialware appliance 444 is positioned between enterprise 440 and external social networking sites 384. In some embodiments, the above-described Socialware applications are installed within secured network 442 in enterprise 440. Socialware Appliance 444 functions as an intercepting proxy for secured network 442 and connects users 300 and external social networking sites 384. As FIG. 20 illustrates, Socialware Appliance 444 is placed in the path of all network traffic for enterprise 440. From this point, Socialware Appliance 444 can monitor all internet traffic and manage enterprise-wide activities associated with external social networking sites 384, without intervention or knowledge by end user 300.

Figure 21:
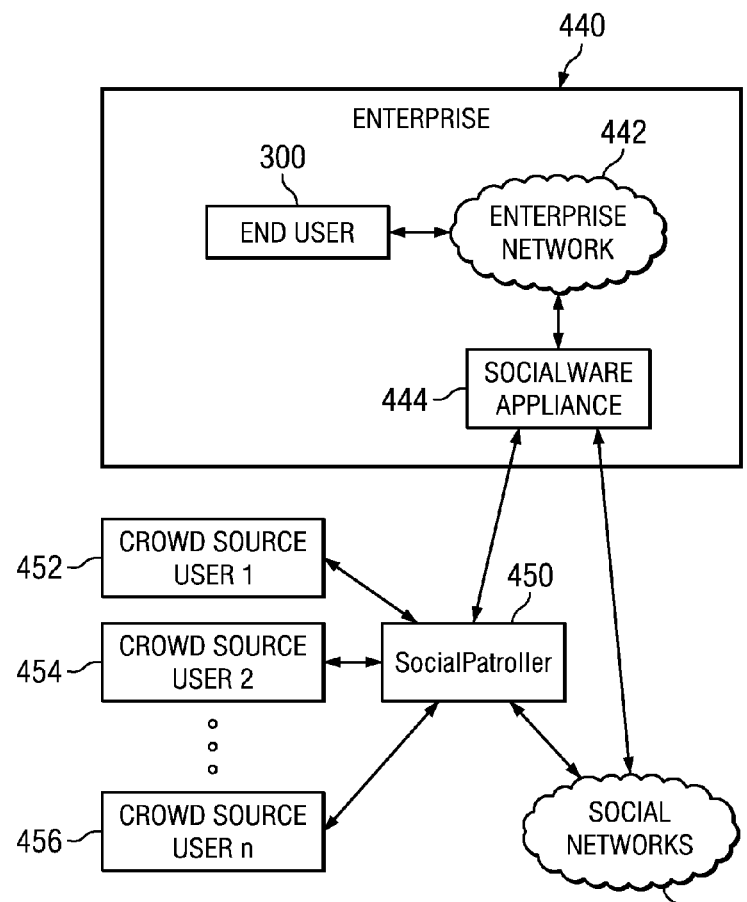
FIG. 21 depicts a diagrammatic representation of an embodiment of Socialware appliance working in conjunction with an embodiment of SocialPatroller to continuously and adaptively monitor and control traffic to and from social networking sites.

FIG. 21 depicts a diagrammatic representation of an embodiment of Socialware appliance 444 working in conjunction with an embodiment of SocialPatroller appliance 450 to continuously and adaptively monitor and control traffic to and from social networking sites 384. In this example, Social Patroller appliance 450 is situated outside of enterprise 440. This allows other users 452, 454, and 456 to report malicious and/or potentially malicious content while benefitting from the reports generated from within enterprise 440. This also allows users connected to Social Patroller appliance 450 to help police social networking sites 384 for malicious and potentially malicious code. Furthermore, by moving Social Patroller appliance 450 to a centralized location, it provides significantly more flexibility. One of these improvements is an enhanced ability to respond and adapt to new threats. If a new threat is identified, Social Patroller appliance 450 can immediately be updated to locate and neutralize the threat without having to wait for a release cycle or an end user update, which is what current virus scanners do.

Although shown and described throughout this disclosure with specific reference to an enterprise, this disclosure is intended to encompass other networking and business environments including, but not limited to: small businesses, individual users, homes, public networks, etc. It should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. For example, in addition to the above described embodiments, those skilled in the art will appreciate that this disclosure has application in a wide array of arts in addition to social networking and this disclosure is intended to include the same. Accordingly, the scope of the present disclosure should be determined by the following claims and their legal equivalents.

What is claimed is:

1. A method for secure communication utilizing social networking sites, comprising:
    determining, by a server computer, whether a post from a client device communicatively connected to the server computer is for a social networking site, the server computer and the social networking site being independently owned and operated in different computing environments;
    if the post is not for a social networking site, passing the post to its destination;
    if the post is for a social networking site, determining, by the server computer, whether the post contains information not to be made public on the social networking site;
    if the post does not contain confidential information, the server computer forwarding the post to the social networking site without modifying the post; and
    if the post contains confidential information not to be made public on the social networking site, the server computer generating secured data and forwarding the secured data to the social networking site in place of the confidential information or in place of the post, allowing the secured data to be posted on the social networking site.

2. The method according to claim 1, wherein the secured data is generated by encrypting the post or the confidential information contained in the post.

3. The method according to claim 1, wherein the secured data is generated by associating the post with a placeholder, wherein the secured data comprises the placeholder.

4. The method according to claim 1, wherein the confidential information comprises a file attached to the post.

5. The method according to claim 4, wherein attaching the file to the post is an impermissible activity and wherein the server computer is configured to prevent the impermissible activity from taking place.

6. The method according to claim 5, further comprising:
    notifying the end user that the post is associated with the impermissible activity.

7. The method according to claim 1, further comprising:
    determining, by the server computer, whether a message from the social networking site contains protected or encrypted information;
    if the message from the social networking site does not contain any protected or encrypted information, the server computer forwarding the message to a recipient without modifying the message;
    if the message from the social networking site contains protected or encrypted information and if the recipient is not authorized to view the protected or encrypted information, the server computer forwarding the message to the recipient without modifying the message such that the recipient receives the protected or encrypted information as-is; and
    if the message from the social networking site contains protected or encrypted information and if the recipient is authorized to view the protected or encrypted information, the server computer desecuring or decrypting the protected or encrypted information to generate desecured data and forwarding the desecured data to the recipient.

8. A computer program product comprising at least one non-transitory computer readable medium storing instructions translatable by at least one processor to perform:
    determining whether a post from a client device communicatively connected to a server computer is for a social networking site, the server computer and the social networking site being independently owned and operated in different computing environments;
    if the post is not for a social networking site, passing the post to its destination;
    if the post is for a social networking site, determining whether the post contains information not to be made public on the social networking site;
    if the post does not contain confidential information, forwarding the post to the social networking site without modifying the post; and
    if the post contains confidential information not to be made public on the social networking site, generating secured data and forwarding the secured data to the social networking site in place of the confidential information or in place of the post, allowing the secured data to be posted on the social networking site.

9. The computer program product of claim 8, wherein the secured data is generated by encrypting the post or the confidential information contained in the post.

10. The computer program product of claim 8, wherein the secured data is generated by associating the post with a placeholder, wherein the secured data comprises the placeholder.

11. The computer program product of claim 8, wherein the confidential information comprises a file attached to the post.

12. The computer program product of claim 11, wherein attaching the file to the post is an impermissible activity and wherein the instructions are further translatable by the at least one processor to perform:
    preventing the impermissible activity from taking place.

13. The computer program product of claim 12, wherein the instructions are further translatable by the at least one processor to perform:
    notifying the end user that the post is associated with the impermissible activity.

14. The computer program product of claim 8, wherein the instructions are further translatable by the at least one processor to perform:
    determining whether a message from the social networking site contains protected or encrypted information;

if the message from the social networking site does not contain any protected or encrypted information, forwarding the message to a recipient without modifying the message;

if the message from the social networking site contains protected or encrypted information and if the recipient is not authorized to view the protected or encrypted information, forwarding the message to the recipient without modifying the message such that the recipient receives the protected or encrypted information as-is; and if the message from the social networking site contains protected or encrypted information and if the recipient is authorized to view the protected or encrypted information, desecuring or decrypting the protected or encrypted information to generate desecured data and forwarding the desecured data to the recipient.

15. A system for secure communication utilizing social networking sites, comprising:

at least one processor; and at least one non-transitory computer readable medium storing instructions translatable by the at least one processor to perform:

determining whether a post from a client device communicatively connected to a server computer is for a social networking site, the server computer and the social networking site being independently owned and operated in different computing environments;

if the post is not for a social networking site, passing the post to its destination;

if the post is for a social networking site, determining whether the post contains information not to be made public on the social networking site;

if the post does not contain confidential information, forwarding the post to the social networking site without modifying the post; and if the post contains confidential information not to be made public on the social networking site, generating secured data and forwarding the secured data to the social networking site in place of the confidential information or in place of the post, allowing the secured data to be posted on the social networking site.

16. The system of claim 15, wherein the secured data is generated by encrypting the post or the confidential information contained in the post.

17. The system of claim 15, wherein the secured data is generated by associating the post with a placeholder, wherein the secured data comprises the placeholder.

18. The system of claim 15, wherein the confidential information comprises a file attached to the post.

19. The system of claim 18, wherein attaching the file to the post is an impermissible activity and wherein the instructions are further translatable by the at least one processor to perform:

preventing the impermissible activity from taking place.

20. The system of claim 19, wherein the instructions are further translatable by the at least one processor to perform:

notifying the end user that the post is associated with the impermissible activity.

* * * * *